United States Patent
McIlhargey

(10) Patent No.: US 6,412,571 B1
(45) Date of Patent: Jul. 2, 2002

(54) SPRING TINE COULTER TILL

(75) Inventor: Joseph F. McIlhargey, Lucan (CA)

(73) Assignee: 3908283 Canada Inc., Lucan (CA)

( * ) Notice: Subject to any disclaimer, the term of this patent is extended or adjusted under 35 U.S.C. 154(b) by 0 days.

(21) Appl. No.: 09/664,708

(22) Filed: Sep. 19, 2000

(30) Foreign Application Priority Data

Sep. 22, 1999 (CA) .............................................. 2282993

(51) Int. Cl.[7] .............................................. A01B 35/28
(52) U.S. Cl. ...................................................... 172/572
(58) Field of Search ................................. 172/643, 705, 172/706, 707, 708, 711, 572, 573, 570, 500, 574, 264

(56) References Cited

U.S. PATENT DOCUMENTS

| | | | | |
|---|---|---|---|---|
| 2,750,861 A | * | 6/1956 | Erwin | 172/707 |
| 3,171,243 A | * | 3/1965 | Johnston | 172/711 |
| 3,296,985 A | * | 1/1967 | Shelton | 172/711 X |
| 4,589,497 A | * | 5/1986 | Kovar | 172/707 |
| 5,267,619 A | * | 12/1993 | Eversole | 172/572 |
| 6,158,523 A | * | 12/2000 | Gengler et al. | 172/574 |

* cited by examiner

Primary Examiner—Robert E. Pezzuto

(57) ABSTRACT

A coulter wheel assembly for mounting to a farm implement having a frame. The assembly includes a vertical shank having a coil spring at substantially its mid-point and upper and lower shank members extending therefrom. The upper shank member is attached to the frame by means of a mounting bracket and the lower shank member is attached to a rotatable hub. A coulter wheel for engagement of the soil is mounted on the hub. The coulter wheel assembly is used, for example, with no-till planting equipment in order to prepare the soil prior to seed introduction. In operation, the coulter wheel rotates along the ground, thereby penetrating the soil, and is permitted to deflect in response to impact with obstructions by means of the coil spring; the coulter wheel then returns to its original path, thereby providing a uniformly prepared soil surface and preventing damage to the coulter wheel assembly or the implement.

6 Claims, 2 Drawing Sheets

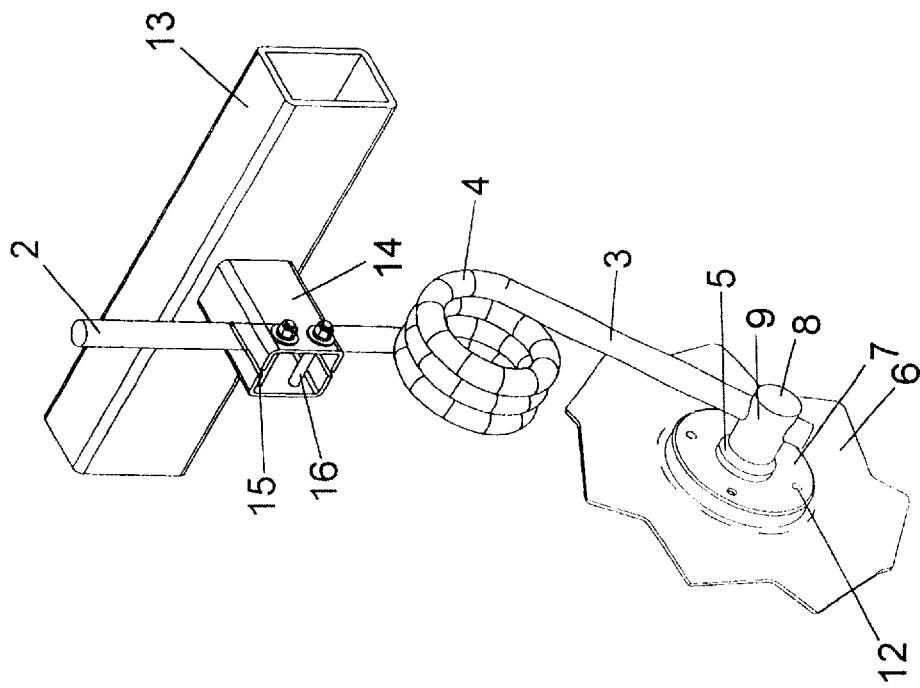
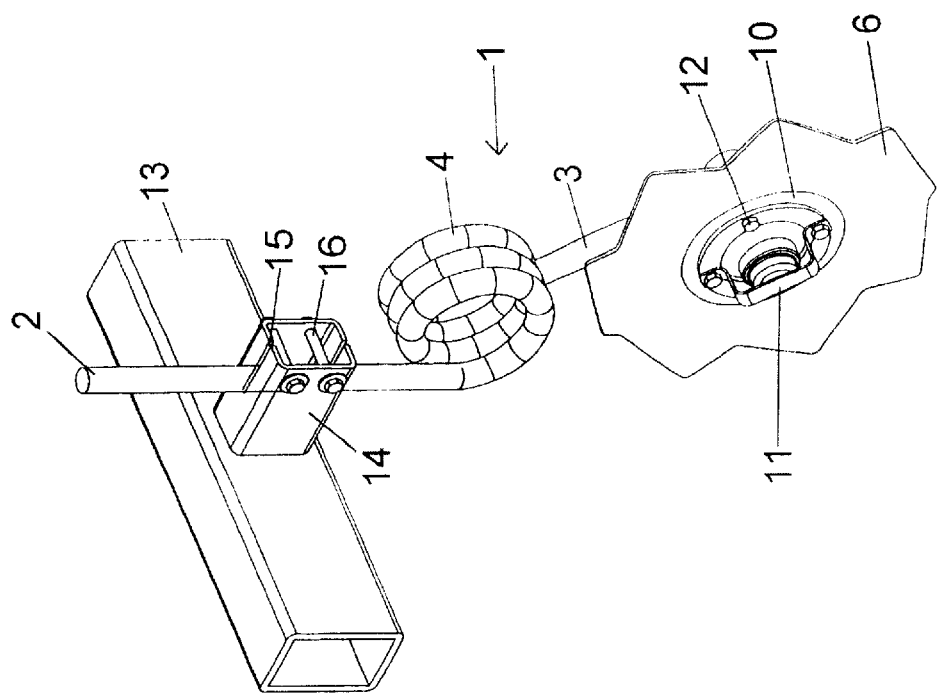

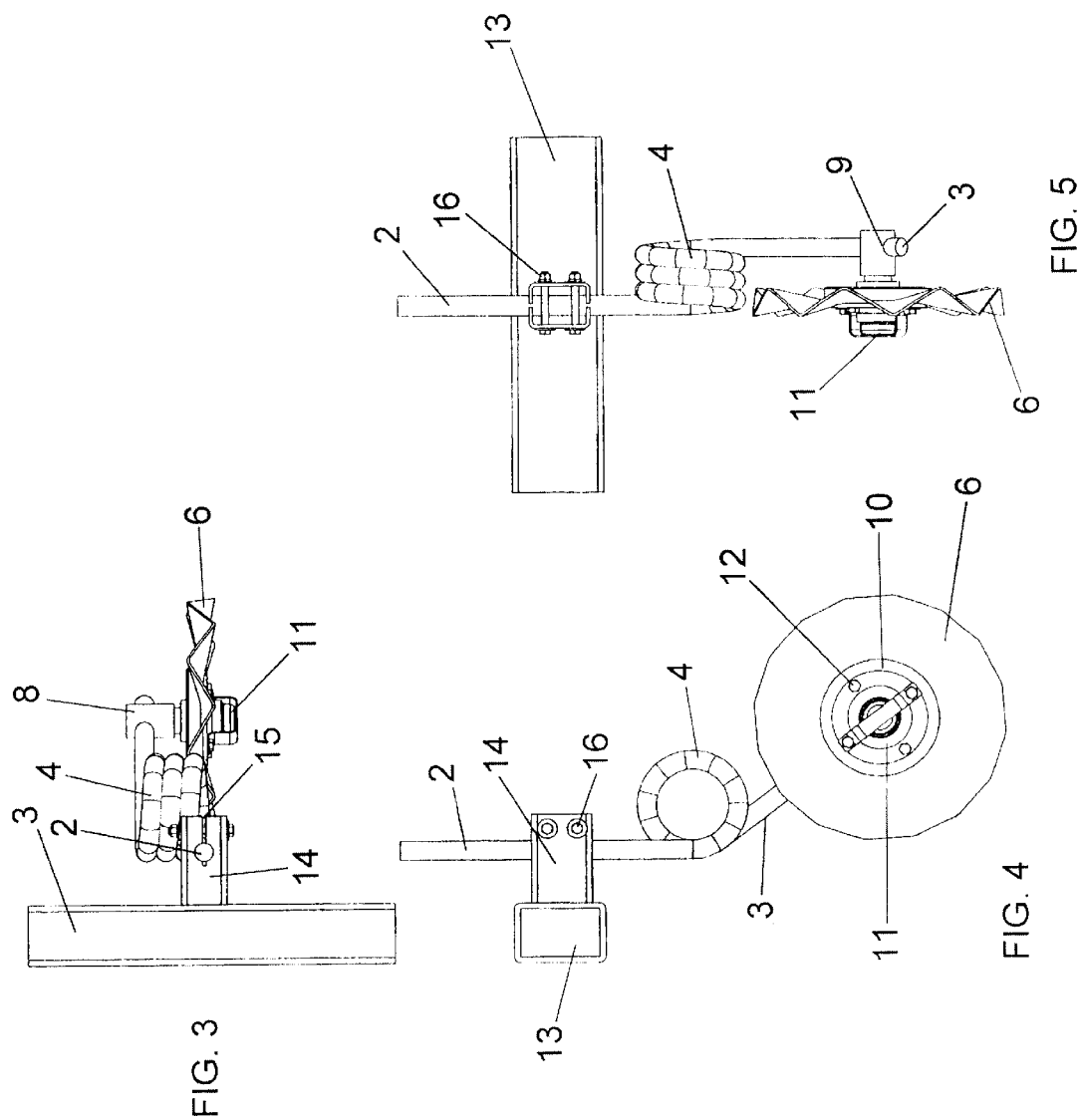

SPRING TINE COULTER TILL

BACKGROUND OF THE INVENTION

1. Field of the Invention

The present invention relates to a coulter wheel assembly for soil preparation. Specifically, the invention relates to a coulter wheel assembly used with no-till planting equipment.

2. Prior Art

No-till or conservation tillage methods were designed to prevent the soil erosion problems associated with previous cultivation methods. These methods cultivate the minimal amount of soil required for the proper placement of seeds.

Certain no-till methods employ the use of rotatable coulter wheels in the preparation of seedbed furrows. The coulter wheels engage the soil and the movement of the equipment rotates the wheels, which penetrate the surface in order to cut and mix the soil. However, in operation, the path of the wheel is often impeded by various obstructions such as stones or stubble from the previous crop. These obstructions can cause the coulter wheel to be upwardly deflected, disengaging the wheel from contact with the soil and creating a non-uniformly prepared soil surface. The impact may also shock the coulter wheel assembly and impart a loading to the shank that can potentially damage the assembly or the farm implement to which it is attached.

BRIEF SUMMARY OF THE INVENTION

The present invention is designed to overcome the disadvantages associated with the prior art devices mentioned above. As such, an object of the invention is to provide an improved coulter wheel assembly that is quiet in operation, durable, simple in design and requiring minimal maintenance.

An additional object of the invention is to provide a coulter wheel assembly with superior shock loading characteristics. Such a design advantageously ensures optimal soil penetration depth and uniformity by promoting straight-line coulter travel. In addition, the shock loading characteristics of the present invention provide a uniformly prepared soil surface by ensuring minimal disturbance to the soil surface out of the direct path of the coulter wheel.

The objects of the present invention are achieved through use of a coulter wheel assembly comprising a fluted coulter wheel rotatably mounted to a spring tine by means of a rotatable hub. In operation, the coulter wheel assembly is attached to a farm implement by means of a mounting bracket.

BRIEF DESCRIPTION OF THE DRAWINGS

The objects and advantages of the invention as discussed above will be further understood in light of the following description of the preferred embodiments that will be described in conjunction with the accompanying drawings in which:

FIG. 1—is a perspective view of the coulter wheel assembly.

FIG. 2—is another perspective view of the coulter wheel assembly that is complementary to the view shown in FIG. 1.

FIG. 3—is a perspective top view of the coulter wheel assembly.

FIG. 4—is a perspective side view of the coulter wheel assembly.

FIG. 5—is a perspective end view of the coulter wheel assembly.

DETAILED DESCRIPTION OF THE INVENTION

Referring specifically to FIGS. 1, 2, and 5 the shank, generally shown at 1, is substantially circular-shaped in cross-section and comprises upper (2) and lower (3) shank members. Between the shank members several loops of a coil spring (4) are centrally located, to provide flexibility to the shank. In the preferred embodiment shown, the shank includes three substantially vertical loops (4). However, the number of loops can vary without departing from the spirit of the invention.

Referring to FIGS. 1, 2 and 4, a rotatable hub (5) attaches the rotatable coulter wheel (6) to the lower shank member (3) as described hereinafter. The hub (5) comprises a flat circular plate (7) with an integrally formed, centrally located cylindrical shaft (8). The distal end of the shaft (8) is provided with an aperture (9) through which the lower shank member (3) is inserted and suitably secured.

The centrally located aperture of the fluted coulter wheel (6) is attached to the flat circular plate (7) of the hub. A flat circular ring is located between the coulter wheel and the hub bearing cap retainer. The inner most diameter of the ring corresponds to the diameter of the wheel aperture. The hub bearing cap retainer (11) functions to securely fasten the ring (10), wheel (6) and hub (5) together by means of mounting bolts (12). The bolts are threadingly engaged through corresponding holes located in the cap retainer and the hub.

Referring to FIGS. 1, 2 and 3, the coulter wheel assembly is adapted for connection to a farm implement having a frame (13) by means of a mounting bracket (14) welded to the frame. The bracket (14) is secured to the lateral surface of the frame and oriented such that the coulter wheel assembly is held substantially vertical. The upper shank member (2) passes through a circular aperture in slit (15) located at the distal end of the mounting bracket (14). Once the arm is in place, bolts (16) are passed through corresponding apertures at the distal end of the bracket. The bolts are securely fastened by corresponding nuts, thereby drawing the slit closed and engaging the upper shank member within the aperture.

In use, as the farm implement moves forward, its motion rotates the coulter wheel along the ground, thereby penetrating the soil to the desired depth. When the wheel encounters an obstruction, the flexibility provided by the spring allows the wheel to maintain a substantially continuous path along the soil by causing the wheel to deflect in response to the obstruction.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A coulter wheel assembly for attachment to the frame of a farm implement used in the planting of crops; said assembly comprising a coil spring element and a coulter wheel element; said coil spring element having a coil spring portion having shank ends extending outwardly and substantially tangentially to said spring at each end thereof; said coulter wheel element having a rotatable hub concentrically mounted to a coulter wheel; wherein one of said shank ends is attached to said frame and the other said shank end is attached to said hub.

2. The coulter wheel assembly of claim 1, wherein said coil spring element is in substantially vertical alignment with said coulter wheel element.

3. The coulter wheel assembly of claim 2, wherein said coil spring portion includes a plurality of parallel coils.

4. The coulter wheel assembly of claim 3, wherein said attachment of said shank end to said frame is by means of a bracket, said bracket fixedly attached to a lateral surface of said frame member and having a slit with an aperture for passing one of said ends of said shank therethrough.

5. The coulter wheel assembly of claim 4, wherein said attachment of said shank end to said hub is by means of a shaft extending outwardly from the center of said hub, said shaft including an aperture for receiving one end of said shank therethrough.

6. The coulter wheel assembly of claim 5, wherein said coulter wheel element rotates along the ground, thereby causing said coulter wheel to penetrate the soil.

* * * * *